United States Patent [19]
Vogt et al.

[11] Patent Number: 4,787,166
[45] Date of Patent: Nov. 29, 1988

[54] COLLAPSIBLE ENCLOSED FISHERMAN'S SIGNALING DEVICE

[76] Inventors: Wayne J. Vogt, 702 S. 15th St.; Ernest J. Clouse, 604 S. 11th St., both of Olivia, Minn. 56277

[21] Appl. No.: 147,538
[22] Filed: Jan. 25, 1988
[51] Int. Cl.⁴ .............................................. A01K 97/12
[52] U.S. Cl. .................................................... 43/17
[58] Field of Search ........................................ 43/17, 16

[56] References Cited
U.S. PATENT DOCUMENTS

| D. 196,888 | 11/1963 | Pilsner | D72/1 |
|---|---|---|---|
| 2,618,091 | 11/1952 | Sheraski | 43/17 |
| 2,786,294 | 3/1957 | Whitacre | 43/17 |
| 3,230,655 | 1/1966 | Nomsen | 43/17 |
| 3,352,313 | 11/1967 | Kroening | 135/1 |
| 3,387,401 | 6/1968 | Stelmach | 43/17 |
| 3,545,118 | 12/1970 | Stelmach | 43/17 |
| 3,824,730 | 7/1974 | Johnson | 43/17 |
| 3,826,270 | 7/1974 | Hentges | 135/4 R |
| 4,246,716 | 1/1981 | Elmer | 43/17 |
| 4,253,262 | 3/1981 | Johnson | 43/17 |
| 4,571,876 | 2/1986 | Le Clair | 43/17 |
| 4,621,446 | 11/1986 | Anderson | 43/17 |
| 4,662,099 | 5/1987 | Stewart | 43/17 |

Primary Examiner—Gene P. Crosby
Attorney, Agent, or Firm—Schroeder & Siegfried

[57] ABSTRACT

An ice fishing apparatus includes a collapsible container having a base having an opening therein, a lid which is pivotally mounted to the base, and a flexible body member peripherally connected to the base and the lid and disposed therebetween so as to provide a complete enclosure of the area between the base and lid when the lid is in its open position. The flexible body is preferably made of the heat reflected material so as to cause the heat generated by a combined heat and light source contained within the container to prevent ice build-up on the fishing line and in the fishing hole. The container has signaling structure which, when triggered, causes the light contained within the container to be emitted outside the container. The flexible body of the container collapses when the lid is closed thereby providing an easily transportable compact case for the ice fishing apparatus.

22 Claims, 1 Drawing Sheet

U.S. Patent    Nov. 29, 1988    4,787,166
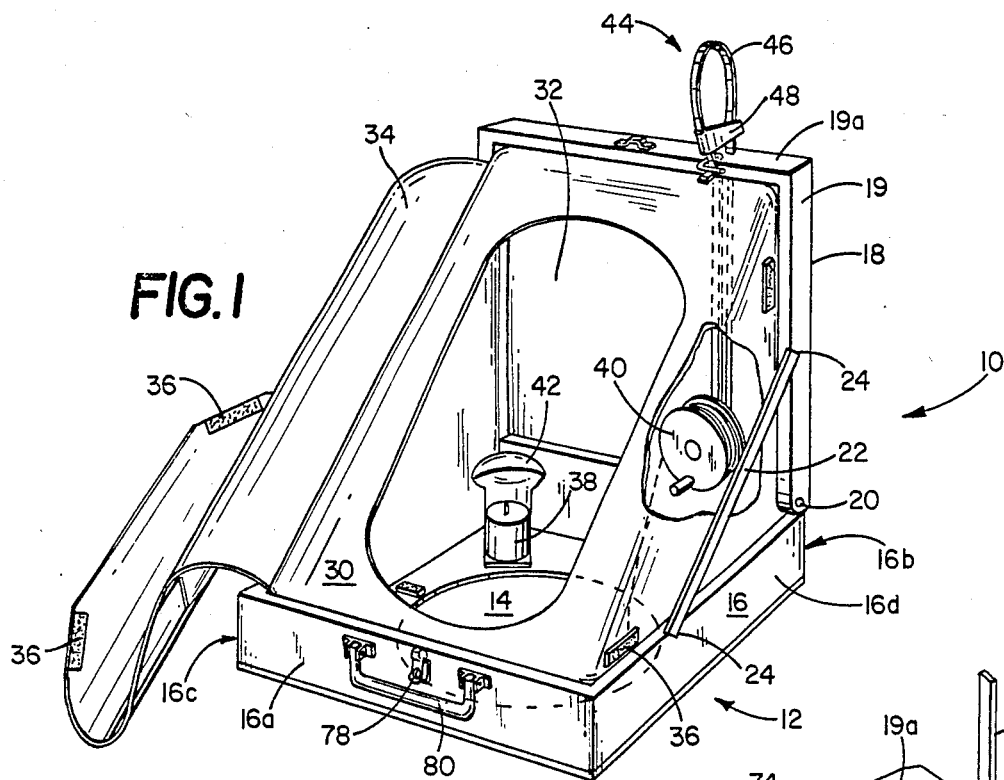
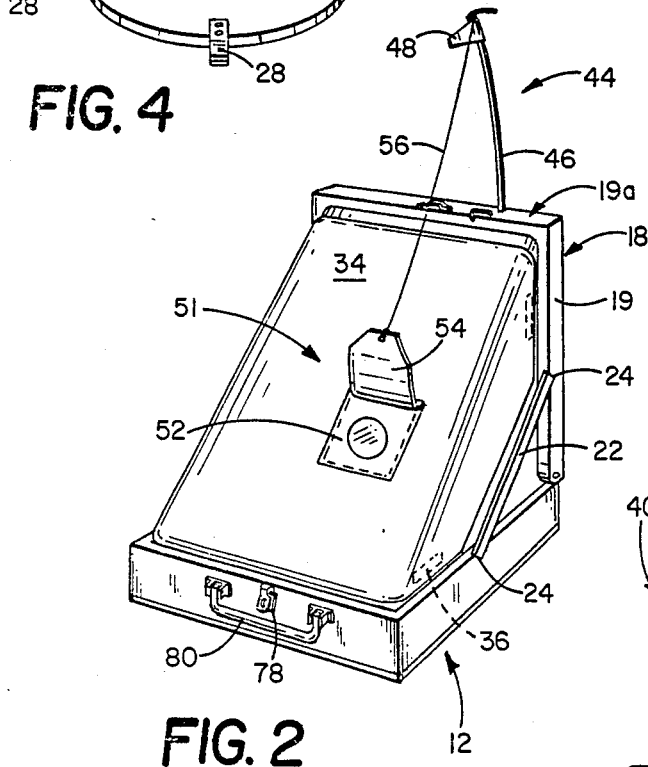
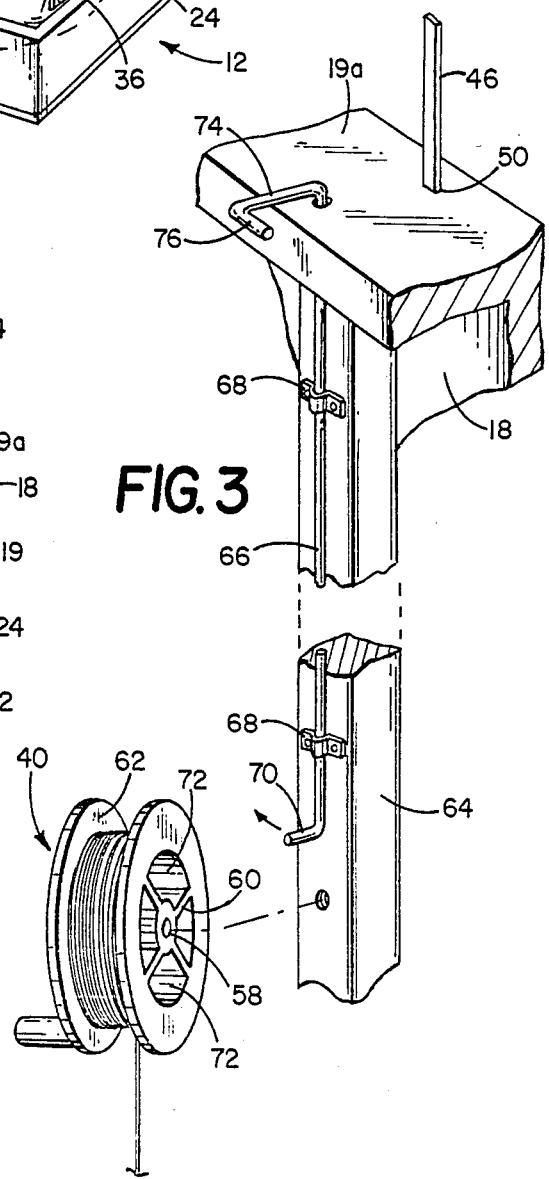

COLLAPSIBLE ENCLOSED FISHERMAN'S SIGNALING DEVICE

BACKGROUND OF THE INVENTION

The invention described herein relates to improvements in combined fishing and signaling devices for use during ice fishing.

Quite often fisherman are allowed to have more than one fishing line in the water when they are ice fishing. If the lines are separated by some distance it becomes difficult for the fisherman to effectively watch both lines. Thus, there is a need for an effective means of signaling a fisherman that a bite or a catch of a fish has occurred. A signaling apparatus for this purpose must function both during the daytime hours and at nighttime.

Conventional combined ice fishing and signaling devices have utilized various signaling devices such as "tip-up" flag devices, light emitting, or sound signaling devices. In each case, the conventional devices used have been extremely cumbersome to handle and transport. Many such devices are either to large or they are of such a peculiar shape that effective storage or handling is hindered.

Furthermore, because many of the conventional combined fishing and signaling devices have rather intricate parts exposed, such devices are often of a peculiar shape, thereby making them susceptable to being easily damaged. On the other hand, the conventional devices which do provide a means for enclosing the more delicate features of the fishing apparatus, such as the reel and signaling means, are contained in large bulky containers which not only makes it difficult for transporting the same, but also causes the container to be quite heavy.

The present invention, however, solves the inherent deficiencies of the conventional devices by providing a compact collapsible container which provides a complete enclosure and functions as a signaling means also. All the intricate components of the fishing apparatus such as the fishing reel and the signaling means are entirely enclosed within the container during storage, and the container collapses into a simple compact lightweight case which can be carried quite easily. The total size of the improved fishing apparatus when closed for transportation is approximately the size of a brief case.

BRIEF SUMMARY OF THE INVENTION

As stated above, the invention herein is an improved ice fishing and signaling apparatus which is collapsible into a brief case size container for easy storage and transportation.

Generally, the container is comprised of simply a base having an opening therein which is to be placed over a fishing hole which is cut in the ice and is adapted for receiving the fishing line from a fishing reel which is contained inside the container: a lid which rests on top of the base and is pivotally connected thereto, which may be closed for carrying the case, and is open when the fisherman desires to fish; and a flexible body member which extends between the base and the lid and encloses the area therebetween thereby creating a completely enclosed container.

A fishing reel carrying the fishing line is connected to the container and contained therein so that the adverse effects of the cold from the winter air and wind will not cause a build-up of ice on the fishing line. Also contained in the container is a combinational light and heat source, such as a candle, and a heat deflector which deflects the heat from the candle toward the fishing hole and fishing line, thereby preventing any ice build-up on either of the same. The container also has a cover for the opening in its base which is utilized during storage or transportation of the container.

The flexible body member which extends between the base and the lid of the container has an aperture in its front side which is normally covered by a flexible hood which is made of the same material as the flexible body member and is carried thereby. The aperture in the flexible body member provides for easy access inside the container where it will be necessary to periodically adjust the fishing line, check the fishing bait, or reel in a fish. The flexible hood normally covering the aperture and the flexible body member is of course necessary to provide a complete enclosure so as to retain the heat from the combined light and heat source. Moreover, the flexible body member and hood are preferably made of a heat reflective material thereby minimizing any heat loss through the walls of the flexible material.

As mentioned in the Background of the Invention, it is necessary for the invention to provide a signaling device which is effective both during the daytime hours and at night. To accomodate this, the present invention has two signaling means. The first signaling means, which is especially suited for daytime hours, is a conventional "tip-up" flag type signaling means. This "tip-up" type signaling means is simply a spring loaded flag assembly that may be easily mounted to the front edge of the lid. A triggering means extends through the front edge of the lid and is controlled by the reel inside the container. When the reel turns due to a bite or a catch of a fish, the triggering means releases the spring loaded signaling device which then extends straight up into the air and signals the fisherman of the fish bite or catch.

The second signaling means is specially adapted for nighttime use. The flexible hood contains a window therein and carries a flap which normally covers the window and retains the light from the combined heat and light source within the container. The flap covering the window is connected to the first "tip-up" type signaling means by a string or other suitable connection and is thereby engaged and controlled by the triggering means and reel. When the triggering means is actuated by the reel, the spring loaded "tip-up" signaling device is released, thereby pulling the flap away from the window. The light from the combined light and heat source contained within the container is thereby permitted to skins through the window in the flexible hood and can then be seen by the fisherman.

When the improved fishing apparatus is not in use, the cover for the opening in the base may be put in place, and all the pieces to the combined fishing and signaling device may be stored in the container. The lid of the container may then be closed and the flexible body member and hood may be collapsed within the container with the result that the fisherman now has a compact case which may be easily transported or stored without worry of pieces being lost or broken.

BRIEF DESCRIPTION OF THE DRAWINGS

A detailed description of one preferred embodiment of the COLLAPSIBLE ENCLOSED FISHERMAN'S SIGNALING DEVICE is hereafter described with specific reference being made to the drawings which:

FIG. 1 shows a perspective view of the preferred embodiment of this invention with the flexible hood open for view of the inside of the container and a cut away portion showing placement of the reel therein;

FIG. 2 is a perspective view of the improved ice fishing and signaling apparatus with the hood in its closed position and showing both the first "tip-up" type signaling means and the second light emitting signaling means in their actuated positions;

FIG. 3 is an enlarged scale of an exploded view of the triggering means which actuates the signaling means when triggered by the rotation of the reel; and FIG. 4 is a perspective view of the cover for the opening in the base of the container.

DETAILED DESCRIPTION OF THE PREFERRED EMBODIMENT

As shown specifically in FIG. 1, the present invention is a combined fishing and signaling apparatus or container 10 for use during ice fishing. The container 10 has a rigid base 12 with an opening 14 therein which is adapted for placing over a fishing hole in the ice, such that the fishing line from a fishing reel may be inserted down through opening 14 into the fishing hole cut in the ice. The base 12 has a sidewall 16 which extends vertically from base 12 and peripherially therearound, said sidewall 16 having front and rear member, 16a and 16b, respectively, and a pair of side members, 16c and 16d.

A rigid lid 18 is pivotally mounted on the rear member 16b of sidewall 16 to base 12. Lid 18 has edges 19 which extend outward from said lid 18 and peripherially there-around. The edges 19 of said lid 18 are constructed and arranged such that upon closing the lid 18 over the base 12, the edges 19 rest upon the sidewall 16 of base 12.

When lid 18 is in its open position, as shown in FIG. 1, lid 18 may be supported in its open position by a pair of struts 22, each strut 22 being constructed to be secured and fit into slots 24 which are cut into each side member, 16c and 16d, of sidewall 16, and in the adjacent edges 19 of lid 18. It will be noted, however, that any other suitable means for holding the lid 18 open may be used.

The base 12 of the container 10 includes a removable cover 26 which is used for covering opening 14 in base 12 when the fishing apparatus is not in use. The cover 26 has index tabs 28 which are used to correctly position the cover 26 over the opening 14 and are also used to secure the cover 26 to the base 12 by any suitable means, such as Velcro fasteners. When use of the fishing apparatus is desired, the cover 26 is simply removed from the base 12 thereby creating the opening 14 which may be positioned over the fishing hole.

The flexible body or sheet member 30, which is disposed between base 12 and lid 18, is essential to providing the collapsible feature of container 10. Flexible member 30 has an aperture 32 which provides a fisherman easy access to the inside of container 10 where the fishing reel and fishing line are contained. A flexible hood 34 is carried by the flexible body member 30 and is constructed and arranged to cover the aperture 32 in the flexible body member 30. Thus, the area enclosed in between the base 12 and the lid 18 by the flexible body 30 when the flexible hood 34 is in its closed position, as shown in FIG. 2, is not subjected to the adverse conditions of the cold winter outside.

In order to form the enclosed area between the rigid base 12 and rigid lid 18 of container 10, the flexible member 30 is connected to base 12 along the sidewall 16 thereof. In other words, the flexible body member 30 extends peripherially around base 12 and is connected to the inside face of side member 16c, front member 16a, and side member 16d of sidewall 16, and extends therefrom to the lid 18 and is peripherally connected thereto along the inside faces of edges 19. The result is a collapsible container 10 which has an enclosed area between its base 12 and lid 18, such that when the lid 18 is moved from its closed position to its open position, as shown in FIG. 2, the area between the base 12 and lid 18 remains enclosed. In order to gain access to the area within the container 10, the flexible hood 34, which is normally closed and attached by suitable means 36, may be opened and folded back.

As shown in FIG. 1, the combined light and heat source 38 such as a candle is contained within container 10. Also contained within container 10 is a fishing reel 40 which carries a fishing line with a hook (not shown) attached thereto. The heat is provided by the combined heat and light source 38 and deflected by heat deflector 42 toward the opening 14 in base 12. By so doing, the heat from candle 38 prevents any ice build-up in the fishing hole or on the fishing line. It should be noted that the flexible material used for the flexible body member 30 and flexible hood 34 is preferably heat reflective and heat resistant, thereby contributing to keeping the enclosed area between base 12 and lid 18 of container 10 free from the adverse effects of the cold winter outside.

As shown in FIG. 2, the ice fishing apparatus of this invention also functions as a signaling device to the fisherman to indicate when a catch or bite of a fish has been made. In order for the fishing apparatus to act as a signaling device both in the daytime and at nighttime, two signaling means are provided in this invention.

The first signaling means is a conventional "tip-up" type flag device 44. The "tip-up" type signaling means 44 is simply comprised of an elongated metal flat spring 46 having a flag 48 on its uppermost end. The other end of the spring 46 inserts into a slot 50 on the front face of front member 19a of edge 19 on lid 18. When a fish bite or a catch has occurred, the "tip-up" type signaling means 44 springs from its cocked position (shown in FIG. 1) to its actuated position, as shown in FIG. 2. This signaling means is primarily for use during the daytime as it becomes quite difficult to see the flag during the nighttime.

The second signaling means 51 provided in this invention is primarily for use at nighttime. This second signaling means 51 is comprised of a window 52, made of material such as a translucent red vinyl, and a flap 54 which normally covers the window so that the light which is emitted from the combined light and heat source 38 is contained within the enclosure of container 10. The flap 54 carries a string 56 or other suitable connecting means which connects the flap 54 to the first "tip-up" type signaling means 44 at its uppermost end. The spring 46 of the "tip-up" type signaling means 44 is curved at its uppermost end to facilitate connection of the string 56 carried by the flap 54.

As the first "tip-up" type signaling means 44 is triggered due to a fish bite or catch, the flap 54 of the second signaling means 51 will simultaneously be pulled away from the window 52 in the flexible hood 34. By so doing, light from the combined light and heat source 38 is permitted to be emitted from the inside of container 10 to the outside thereby providing an effective nighttime signal to the fisherman that he has either caught a fish or has had a fish bite.

As shown best in FIG. 3, both signaling means 44 and 51 are controlled and actuated by reel 40. Reel 40 has a center hub 58 and spokes 60 which extend radially outward from said hub to an outer spool 62. Reel 40 is rotatably mounted at center hub 58 to beam 64 which, in turn, is connected to the inside face of lid 18.

Triggering means 66 is also pivotally mounted to beam 64 by a pair of brackets 68. The lower end 70 of triggering means 66 is bent outwardly towards reel 40 and is constructed and arranged such that the lower end 70 extends into one of the cavities 72 formed by adjacent spokes 60 between the central hub 68 and outer spool 62 of the reel 40.

The upper end 74 of the triggering means 66 extends through the front member 19a of edge 19 on lid 18 and is also bent outwardly towards the reel 40, but the uppermost tip 76 of the upper end 74 of the triggering means 66 is further bent so that it extends in a plane parallel with the front member 19a of edge 19 and in a direction opposite to the rotation of the reel 40 as the line is pulled off the reel. The upper portion of triggering means 66 is formed in this manner so that the uppermost tip 76 of the triggering means 66 acts as the catch for the spring 46 of the first "tip-up" type signaling means 44 and enables the same to be cocked prior to any indication of a fish bite.

In operation, when the fisherman decides to go ice fishing, he may simply open the collapsible container 10 and brace the rigid lid 18 in its open position by strut members 22. The flexible flap 34 may then be opened so as to provide access to the inside of container 10 through aperture 32 in the flexible body member. The cover 26 covering the opening 14 in base 12 may then be removed and the fishing apparatus may be placed over a fishing hole in the ice.

Once the fishing line is set at the depth which is desired, the "tip-up" type signaling means 44 may be placed in its cocked position whereby the uppermost end of spring 46 catches on the uppermost tip 76 of the triggering means 66. The string 56 which is carried by flap 54 may then be connected to the bent uppermost end of spring 46. Then the fisherman need only wait for a catch or a bite of a fish.

When a catch or a bite from a fish does occur, the pull on the fishing line will cause the reel 40 to rotate. As reel 40 rotates, one of the spokes 60 will engage the lowermost end 70 of the triggering means 66 and cause the triggering means 66 to pivot. If the pull on the fishing line is sufficiently large, the triggering means will pivot enough to release spring 46 of the first "tip-up" type signaling means 44, thereby causing the flag 48 to raise up into the air.

At the same time, because string 56 is connected to the uppermost end of spring 46, the flap 54 will be pulled up away from the window 52 in the flexible hood 34 and, consequently, light from the combined light and heat source 38 will be permitted to shine through the window. Thus, regardless of whether it is daytime fishing or nighttime fishing, the fisherman will be effectively signaled as to any catch of a fish or fish bite upon the fishing line.

When the fisherman is done fishing he may simply remove the first "tip-up" signaling means 44 from slot 50 in the lid 18 and place it inside the container. Then the cover 26 may be inserted to cover the opening 14 in the rigid base 12 of the container 10, and then by simply removing the struts 22 which hold the rigid lid 18 open and placing them inside the container, the lid 18 can be closed with the flexible body member and flexible hood being carefully folded and collapsed into the area between the rigid base 12 and rigid lid 18.

Lid 18 and base 12 may then be locked together through locking mechanism 78. The resulting structure is simply a compact, easily transportable, case which is about the size of a brief case. The case is provided with a handle 80 to facilitate easy transportation of the collapsed fishing apparatus. Furthermore, because of the compact size of the case, it can be stored in a relatively small area quite easily.

In considering this invention, it should be remembered that the present disclosure is illustrative only and the scope of the invention should be determined by the appending claims.

I claim:
1. A collapsible ice fishing apparatus, comprising:
  (a) a collapsible container having a base with an opening therein;
  (b) a light source contained within said container;
  (c) a fishing reel mounted for rotation within said container and carrying fishing line with a hook attached;
  (d) a triggering means constructed and arranged to be actuated by said reel upon a bite or catch of a fish upon said hook; and
  (e) said container being constructed and arranged to emit light outside said container from said light source within said container upon actuation of said triggering means.

2. The structure defined in claim 1, wherein said container has a lid pivotally mounted to said base and a flexible body member connected to said base and said lid and disposed therebetween and enclosing the area between said base and said lid.

3. The structure defined in claim 2, wherein said flexible body member has an aperture contained therein, and a flexible hood mounted on said flexible body member which is constructed and arranged to cover said aperture when desired.

4. The structure defined in claim 3, wherein said hood has a window which is normally covered by a flap carried by said hood, said flap being connected to said triggering means whereby upon acuation of said triggering means said flap will be lifted outwardly away from said window in said hood thereby permitting light to emit from said light source through said window to the exterior and signaling the fisherman that a catch or a bite of a fish has occurred.

5. The structure defined in claim 1, wherein said light source constitutes a heat source, and a heat deflector contained within said container and positioned in a heat deflecting relationship with said light and heat source such that heat produced by said light and heat source is deflected by said deflector towards the fishing hole and fishing line to prevent ice build-up on the same during fishing.

6. A collapsible ice fishing and signaling apparatus, comprising:
  (a) a collapsible container having a base with an opening therein.
  (b) a heat source contained within said container;

(c) a fishing reel mounted for rotation within said container and equipped with fishing line with a hook attached thereto;

(d) at least one signaling means mounted on said container for signaling the fisherman when a bite or a catch of a fish has been made; and (e) a triggering means constructed and arranged to be actuated by a structral portion of said reel upon a bite or catch of a fish and to trigger said signaling means to thereby signal the fisherman.

7. The structure defined in claim 6, wherein said collapsible container includes:

(f) said base being substantially horizontal and a vertical sidewall extending vertically from and around the outer bounds of said base;

(g) a lid pivotally mounted to said sidewall and constructed and arranged to cover said base and said sidewall when in a closed position; and (h) a flexible body member connected to said base and said lid in an enclosing relation to the area therebetween.

8. The structure defined in claim 7, wherein said flexible body member is heat reflective and fire resistant and extends along said sidewalls of said base and therefrom to said lid along its outer perimeter in enclosing relation to the area between said base and said lid.

9. The structure defined in claim 7, wherein said flexible body member has an aperture and a flexible hood which is carried by said flexible body member and is constructed and arranged to cover said aperture when so desired.

10. The structure defined in claim 9, wherein said heat source also constitutes a light source and said flexible hood carries one of said signaling means and is comprised of a flap connected to said hood and covering a window in said hood, said flap being connected to said triggering means and said triggering means being constructed and arranged so that when said triggering means is actuated by said reel, said flap is pulled away from said window thereby allowing light to emit from said light source contained within said container and to shine through said window and signal the fisherman that a bite or a catch of a fish has been made.

11. The structure defined in claim 6, wherein said heat source constitutes a light source and said signaling means is comprised of a window in said container carrying a flap thereover which is connected to said triggering means, whereby actuation of said triggering means causes said flap to be lifted away from said window in said container thereby allowing light emitted from said heat source to be seen by a fisherman thus signaling him that a bite or a catch of fish has been made.

12. The structure defined in claim 6, wherein said heat source is directed toward said opening in said base of said container.

13. A collapsible ice fishing apparatus, comprising:

(a) a container having a base, a lid pivotally mounted on said base, and a flexible body member connected to said base and said lid and disposed therebetween, said container being constructed and arranged such that when said lid is pivotally moved to its open position, the area within said container remains enclosed;

(b) a fishing reel carrying fishing line with an attached hook contained within and rotatably connected to said container;

(c) said base having an opening for receiving the fishing line from said fishing reel;

(d) said flexible body member having an aperture to facilitate easy access inside said container and a flexible hood to cover said aperture; and (e) a signaling means mounted on said container in controlled relation to said reel and constructed and arranged for signaling the fisherman when a bite or catch of a fish has been made.

14. The structure defined in claim 13, including a light source and a heat source contained within said container.

15. The structure defined in claim 14, wherein said signaling means includes a window in said hood which is normally covered by a flap carried by the same, said flap being constructed and arranged in a controlled relationship with said reel such that when a fish bite or catch is made the flap will be lifted away from the window, thereby allowing the light source contained within said container to be emitted outside said container to signal the fisherman that a fish bite or catch has been made.

16. The structure defined in claim 13, wherein said flexible body member of said container connects peripherally to said base and lid and encloses the area therebetween, said flexible body member being collapsible into the area between said base and said lid when said lid is in a closed position, thereby facilitating easy transportation and storage of the fishing apparatus.

17. The structure defined in claim 14, including a heat deflector which deflects the heat from said heat source oward the fishing hole and fishing line so as to keep the same free from ice build-up.

18. An ice fishing apparatus for signaling a fisherman of a fish bite or catch and for keeping a fishing line and fishing hole free from ice, comprising:

(a) a collapsible container having an opening for receiving the fishing line from a fishing reel;

(b) a fishing reel having fishing line with a hook attached thereto rotatably mounted within said container;

(c) a combined light and heat source contained within said container and constructed and arranged to concurrently act as the heat source for preventing ice build-up on the fishing line and fishing hole, and to provide a light signal to the fisherman when a bite or a catch of a fish has been made; and (d) a signaling means connected in a controlled relationship with said fishing reel, said signaling means being constructed and arranged to emit said light signal from said combined light and heat source to the fisherman when a catch or a bite of a fish has been made.

19. The structure defined in claim 18, wherein said signaling means is comprised of a window in said collapsible container and a flap carried by said container which normally covers said window, said flap being connected in controlled relation to said reel such that when said reel turns said flap is raised away from said window, thereby allowing light from said combined light and heat source to be emitted outside of said container to signal the fisherman that a bite or catch of a fish has been made.

20. The structure defined in claim 18, including a second signaling means mounted on said container and connected in controlled relation to said fishing reel and being constructed and arranged to trigger and signal the fisherman when a bite or a catch of a fish causes said reel to turn.

21. The structure defined in claim 18, wherein said collapsible container includes:

(e) a base having at least one sidewall extending along the perimeter of said base;

(f) a lid pivotally connected to said sidewalls of said base; and (g) a flexible sheet member which extends between the outer perimeter of said base and said lid and encloses the area therebetween, said flexible sheet member having an aperture therein and carrying a flexible hood constructed and arranged to cover said aperture in said flexible sheet member.

22. The structure defined in claim 21, wherein said signaling means is comprised of a window in said hood and a flexible flap carried by said hood in covering relation to said window, said flap being controlled by said reel and constructed and arranged with respect thereto so that when said reel turns due to a fish bite or catch, said flap is pulled away from said window thereby allowing said combined light and heat source to emit light through said window and thus signaling a fisherman that a fish bite or catch has been made.

* * * * *

UNITED STATES PATENT AND TRADEMARK OFFICE
CERTIFICATE OF CORRECTION

PATENT NO. : 4,787,166

DATED : November 29, 1988

INVENTOR(S) : Wayne J. Vogt and Ernest J. Clouse

It is certified that error appears in the above-identified patent and that said Letters Patent is hereby corrected as shown below:

Claim 4, line 7, "llight" should read "light";

Claim 17, line 3, "oward" should read "toward".

Signed and Sealed this

Second Day of May, 1989

Attest:

DONALD J. QUIGG

Attesting Officer

Commissioner of Patents and Trademarks